(12) United States Patent
Carlsen et al.

(10) Patent No.: US 6,733,203 B2
(45) Date of Patent: May 11, 2004

(54) CABLE CONNECTION DEVICE

(75) Inventors: Hans-Paul Carlsen, Notodden (NO); Gunnar Herø, Baerums Verk (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 0 days.

(21) Appl. No.: 10/014,581

(22) Filed: Dec. 14, 2001

(65) Prior Publication Data

US 2002/0076274 A1 Jun. 20, 2002

(30) Foreign Application Priority Data

Dec. 14, 2000 (NO) .......................................... 20006366

(51) Int. Cl.7 .......................................... H01R 13/502
(52) U.S. Cl. ..................... 403/365; 403/367; 403/409.1
(58) Field of Search ............................. 403/409.1, 365, 403/369, 367, 368, 370, 371

(56) References Cited

U.S. PATENT DOCUMENTS

| 3,049,775 | A | * | 8/1962 | Ondeck ....................... 403/365 |
| 3,163,904 | A | * | 1/1965 | Ziolkowski ................. 403/365 |
| 4,293,178 | A |   | 10/1981 | Lee |
| 4,481,697 | A |   | 11/1984 | Bachle |
| 4,845,814 | A |   | 7/1989 | Crook |
| 5,080,614 | A |   | 1/1992 | Utgaren |

FOREIGN PATENT DOCUMENTS

| GB | 827134 | 2/1960 |
| GB | 925122 | 5/1963 |
| GB | 946629 | 1/1964 |
| GB | 1 311 196 | 3/1973 |
| GB | 2 120 021 A | 11/1983 |
| NO | 138257 | 4/1978 |
| WO | WO 86/02705 | 5/1986 |

* cited by examiner

*Primary Examiner*—John R. Cottingham
(74) *Attorney, Agent, or Firm*—Young & Thompson

(57) ABSTRACT

A clamping device for a wire or cable (2), the end of which has to be attached in a housing (10) includes two clamping bodies (7, 8) with interacting conical surfaces. One clamping body (7) is arranged for receiving and passing through the cable (2), which has to be secured. The second clamping body (8) is arranged to exert pressure against the first clamping body for frictional securing of the cable. The clamping bodies are arranged in such a manner that when the tension in the cable increases the clamping bodies enclose the cable more tightly. The invention is particularly suitable for tools that have to be lowered into a well by the cable.

15 Claims, 3 Drawing Sheets

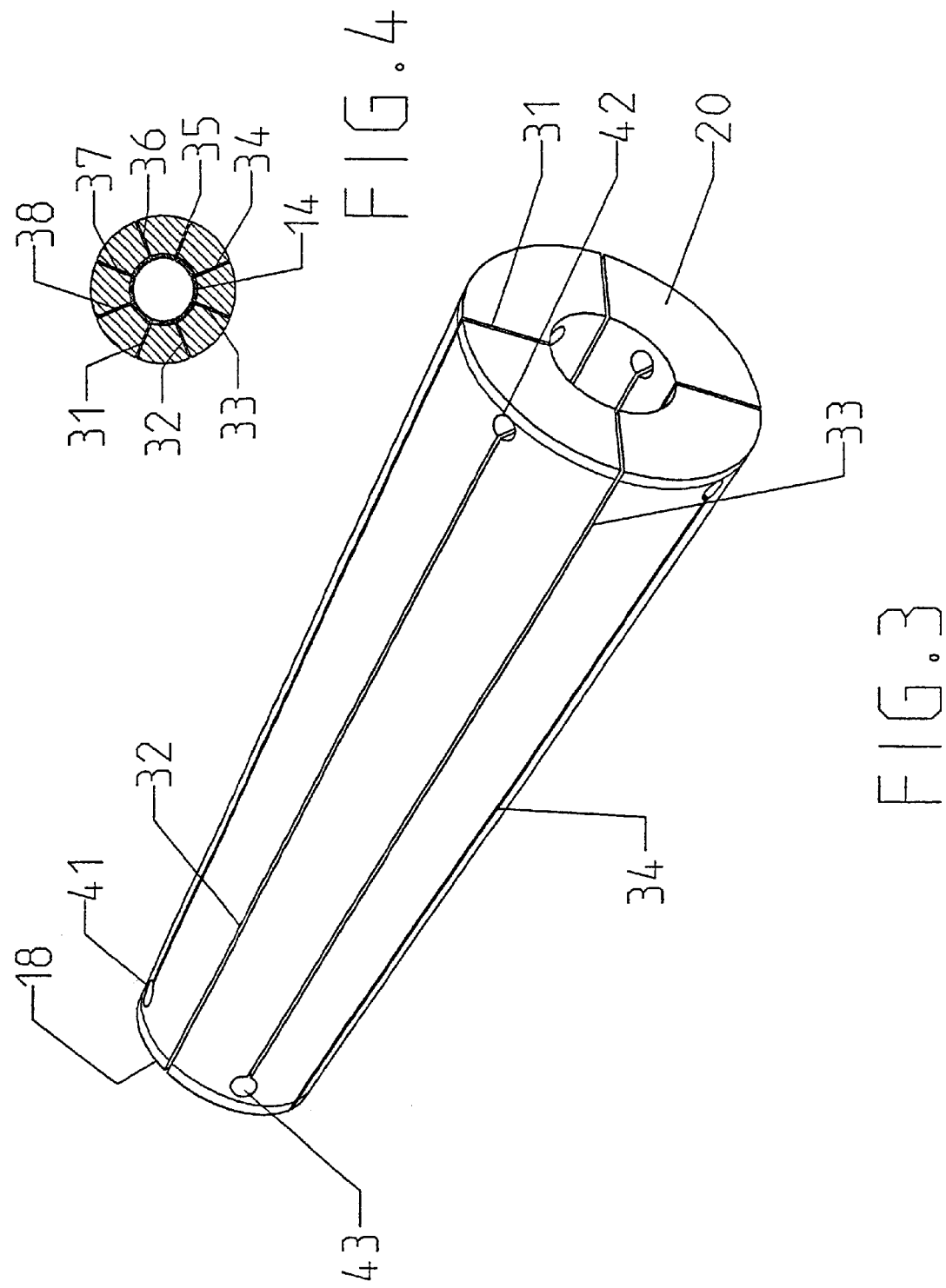

CABLE CONNECTION DEVICE

BACKGROUND OF THE INVENTION

The present invention relates to a cable connection device for attaching an end of a cable to a tool, such as an instrument for use in an oil and/or gas well, which device comprises a housing and a clamping device for securing the cable, which clamping device is attached to the housing and comprises a first clamping body enclosing the cable and a second clamping body attached to the housing.

Several methods exist for attaching a cable or a wire to an end piece. A common method is to shrink the cable on, but this has the disadvantage that it produces unacceptable shear forces in the cable, which may result in short-circuiting of the wires inside the cable. This method is therefore used mostly for wires. Another method is to employ compression sleeve round the cable and a nut, which is screwed over the compression sleeve, thus causing the compression sleeve to clamp round the cable, securing it by means of friction. This provides better control over the clamping forces acting on the cable, since the clamping force is related to the extent to which the nut is tightened. However, this also has the drawback that substantial point forces can be created, which are so great that the cable is destroyed and breaks, or the wires in the cable short-circuit.

It is therefore desirable to provide a clamp connection that provides the least possible clamping force against the cable during normal use, but which offers the opportunity of increasing the clamping force in special cases, up to but not exceeding the cable's breaking strength.

SUMMARY OF THE INVENTION

In the present invention a clamping effect is achieved which acts on the cable over a greater area and which is least where the cable enters the connection. In addition the object is achieved that the clamping effect is increased the higher the tension is in the cable.

This is achieved by the second clamping body having an internal sloping surface, and the first clamping body having an external sloping surface, where the said surfaces interact in order to clamp round the cable and hold it securely.

The connection device according to the invention is particularly suitable for use during intervention in oil or gas wells where a tool or a measuring instrument, which is suspended in a cable or wire, has to be lowered into the well. The cable is employed as a suspension means, i.e. the instrument is lowered or pulled up again by means of the cable. The connection therefore has to be strong enough to hold the tool. Since the cable may creep, it is important that the clamping forces are not greater than is necessary in order to hold the cable. However, the tool or the instruments sometimes become stuck in the well, in which case it is desirable to increase the tension in the cable to its breaking strength without the connection working loose. The connection device according to the invention provides a very good distribution of the clamping force over the connection, which also increases with increasing pulling force.

BRIEF DESCRIPTION OF THE DRAWINGS

The invention will now be described in greater detail with reference to the drawings, in which

FIG. 3 illustrates a second embodiment of a clamping cone.

FIG. 4 is a section along line A—A in FIG. 3.

FIG. 5 is a detail illustrating the clamping surfaces between the clamping cones.

DETAILED DESCRIPTION OF THE PREFERRED EMBODIMENTS

Figure 2:
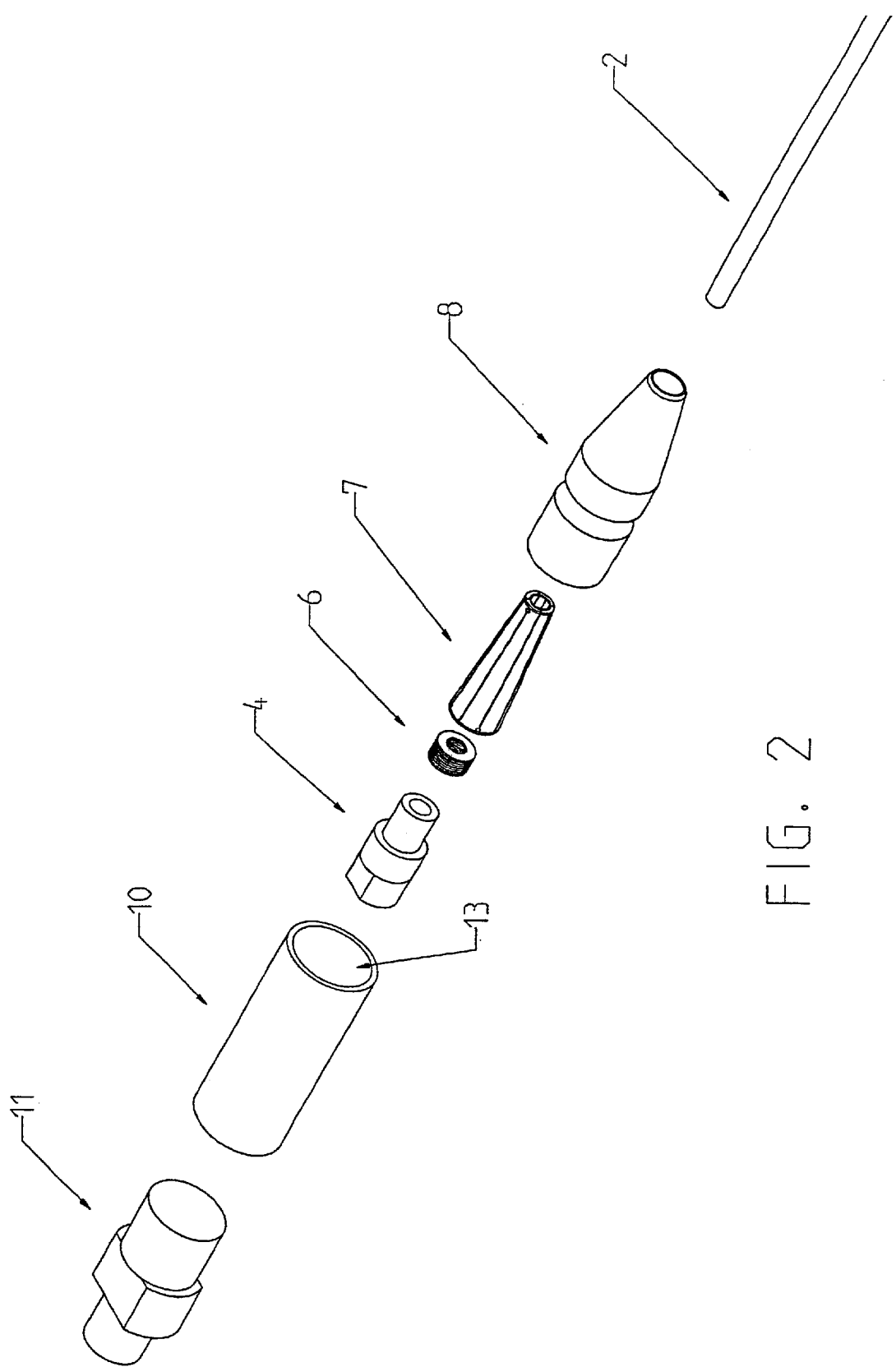
FIG. 2 is an exploded view illustrating the individual parts included in the connection.

In FIG. 2 a cable connection device is illustrated for attaching a cable 2 to an instrument or tool, which has to be lowered into a well. The cable is of a type comprising a number of wires for transmission of electric power and/or signals moulded into a plastic material. As illustrated in FIG. 2, the connection device forms a coupling comprises an adaptor 11 for insertion between the coupling and the instrument, a housing 10, a cable termination 4, a spring 6, an internal clamping cone 7 made of an elastically deformable material and an external clamping cone 8, normally made of metal.

Figure 1:
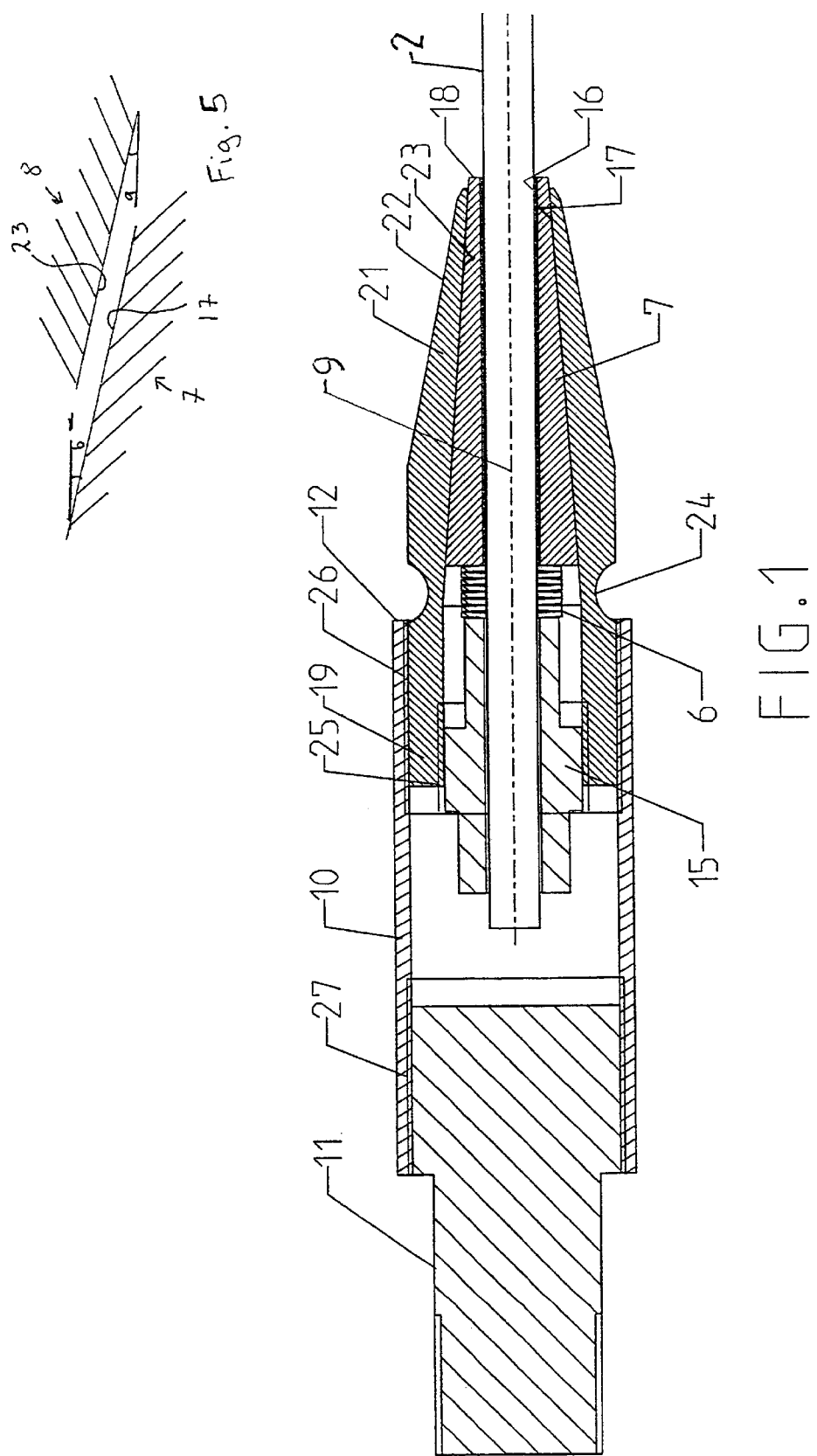
FIG. 1 is a horizontal view through a connection according to the invention.

We now refer to FIG. 1 for a more detailed description of the coupling. The housing 10 is cylindrical in shape and equipped at its ends with internal threads, 26 and 27 respectively. The adaptor 11 is screwed into the rear end of the housing by means of the threads 27. The adaptor comprises means (not shown) for enabling the wires in the cable 2 to be connected to the equipment, gauges, etc. in the instrument.

The cable 2 is inserted in an end sleeve 4. The end sleeve comprises means for terminating the cable together with one or more couplings (not shown), thus enabling the wires in the cable to be connected to the adaptor 11. The end sleeve 4 comprises a thickened portion 15, which is threaded externally for engagement with an external holding/clamping cone 8.

The external clamping cone 8 comprises a first or rear cylindrical portion 19 with threads for screwing into the housing's 10 internal threads 26. An internal cylindrical surface 25 is partly threaded and intended to be screwed to the end sleeve's 4 thickened portion 15. An intermediate portion 24 of the clamping cone 8 has a groove or undercut portion, which permits the clamping cone to be reached and gripped by a special pull-up tool. The front portion 21 of the clamping cone 8 has an external sloping surface 22 inclining forwards and towards the central axis 9, i.e. in the form of a cone. The internal surface 23 also slopes forwards towards the axis 9, forming an angle a with the axis 9, which advantageously lies in the range 1–10°.

The clamping cone may advantageously be equipped with means to enable the front portion 21 of the clamping cone to be released from the rear portion 19. This permits the cable to be pulled out of the instrument and pulled up to the surface if the instrument has become so firmly jammed in the well that the cable or the wire are not capable of releasing the instrument. The means may, for example, be the said undercut portion 24 or consist of breaking pins or the like, which are broken when the tension in the cable is sufficiently high.

The internal holding/clamping cone 7 is also in the form of a cone with an external sloping surface 17 inclining forwards towards the axis 9. A through-going cylindrical bore 16 has a diameter adapted to the cable's 2 external diameter, with the result that the cable is a tight fit in the bore 16.

The external surface 17 of the clamping cone 7 forms an angle b with the axis 9, which is advantageously in the range 1–10°, and it is desirable that the two angles should be approximately equal. When the angle b is equal to the angle a, a uniform contact is obtained between the surfaces 17 and 23 over the entire length. The interacting sloping surfaces will cause the clamping effect against the cable to increase proportionately with increasing tension in the cable.

It is important to find the correct angle (a or b) as seen in FIG. 5. A smaller angle gives greater frictional forces and thereby more secure attachment, but makes it more difficult to release the coupling parts. It has been found that an angle of approximately 4° gives the best combination of these factors. It is particularly advantageous for the angle b to be slightly larger than the angle a, for example when the angle b is 4° and the angle a 3.9°. This angular difference between the sloping surfaces results in the clamping force against the cable increasing by a higher factor the more the cable is pulled while at the same time it is still easy to release the parts from each other. For an easy release may, in addition, the internal sloping surface 23, be coated with a low friction material, e.g. xylan. This ensures an easy release of the parts.

The clamping effect against the cable can be considered to be proportional to the wall thickness of the clamping cone 8 since an increased tension in the cable will result in an increased "pressure" against the inner wall 23 of the clamping cone 8. Since the clamping cone 8 is made of a rigid material, the parts with greater wall thickness will not yield (little elasticity) but provide a counter force. This counter force, however, depends on the wall thickness, with less wall thickness giving a higher degree of elasticity. This means therefore that the greatest forces act where the wall is thickest, i.e. in the rear part. In the front part the counter forces are less, resulting in an elastic deformation of the clamping cone in this area, which is advantageous since the forces against the cable are then reduced in the relatively pointed end. It is desirable to avoid this since forces in or at the point 18 will act as point forces and place unacceptable stresses on the cable.

Between the internal clamping cone 7 and the end sleeve 4 is mounted a spring 6. This causes the internal clamping cone 7 to be pressed against the external clamping cone 8, with the result that the clamping device can be pretensioned. The choice of spring type makes it possible to control the pretensioning.

The internal clamping cone 7 is mounted in such a manner that its front end 18 projects slightly in front of the clamping cone's 8 front edge. The clamping cone 7 can thereby be pushed slightly back against the force of the spring 6, neutralising the locking effect. Use may be made, for example, of a pressure sleeve or the like, which is passed down along the cable.

In a preferred embodiment illustrated in FIGS. 3 and 4 the internal clamping cone 7 is made of metal, for example a high tensile steel material, titanium or other suitable material. The clamping cone's external surface 17 is preferably polished to a mirror finish. In order to provide the necessary elasticity in the clamping cone, the wall is intersected by a number of slots extending from one end towards the opposite end, but terminated in a hole drilled through the wall of the clamping cone at a distance from the end. For example, as illustrated in FIG. 4 eight slots 31, 32, . . . , 38 are distributed uniformly over the circumference. The slots are also advantageously designed so that every second slot begins at one end while those in between begin at the opposite end (see FIG. 3). In FIG. 3, for example, it can be seen that the slot 32 starts at the clamping cone's pointed end 18 and extends to a through-going hole 42 near the clamping cone's blunt end 20. In a similar fashion the groove 33 extends from the blunt end 20 ending in a hole 43 near the pointed end 18.

Alternatively all the slots can be arranged only in one direction, for example from the pointed end 18 towards the blunt end 20 so that the clamping cone resembles a wedge belt.

In connection with the design of the clamping cone 7 illustrated in FIGS. 3 and 4, a rubber sleeve 14 is preferably placed in the central channel 16. The rubber sleeve on the internal surface is advantageously vulcanised to the clamping cone's internal surface 16 and is thin, being around 0.3–0.8 mm. It has the effect of distributing and equalising the forces acting on the cable when the clamping cones are tightened, thus enabling the forces to be distributed evenly over the surface of the cable. This provides a hydrostatic force pattern, which gives a uniform pressure round the entire surface of the cable.

What is claimed is:

1. A cable connection device for attaching an end of a cable to a tool, said device comprising:

a housing, a clamping device attached to the housing for securing the cable, said clamping device comprises a first clamping body, which encloses the cable and a second clamping body, which is arranged to be clamped against the first clamping body, wherein the second clamping body is attached to the housing and has an internal sloping surface, wherein the first clamping body has an external sloping surface, so that said external and internal sloping surfaces interact in order to clamp round the cable to hold the cable securely, and wherein a wall thickness of said second clamping body decreases from a proximal end to a distal end along a portion of said second clamping body that contacts said first clamping body, wherein said proximate end is adjacent to said housing.

2. The device according to claim 1, wherein an angle of the external and internal sloping surfaces with the connection device's center axis is in the range 1–10°.

3. The device according to claim 2, wherein the sloping surfaces have the same angle.

4. The device according to claim 2, wherein the internal sloping surface has an angle which is less than an angle of the external sloping surface.

5. The device according to claim 1, wherein the first clamping body is made of an elastically deformable material.

6. The device according to claim 1, wherein the first clamping body is made of a metal.

7. The device according to claim 6, wherein the first clamping body is intersected by a number of radially extending slots.

8. The device according to claim 7, wherein the slots extend from one end of the clamping body almost to the other end.

9. A cable connection device for attaching an end of a cable to a tool, said device comprising:

a housing, a clamping device attached to the housing for securing the cable, said clamping device comprises a first clamping body, which encloses the cable and a second clamping body, which is arranged to be clamped against the first clamping body, wherein the second clamping body is attached to the housing and has an internal sloping surface, wherein the first clamping body has an external sloping surface, so that said surfaces interact in order to clamp round the cable to hold the cable securely, and wherein the first clamping body comprises a sleeve of an elastic material arranged in a bore of the first clamping body.

10. The device according to claim 1, wherein the internal sloping surface of the second clamping body has a coating of a material with low friction.

11. The device according to claim 1, wherein a spring is mounted between the first clamping body and an end sleeve that is within said housing.

12. The device according to claim 4, wherein the angle of the internal sloping surface is less than the angle of the external sloping surface when there are no forces being exerted on said first clamping body.

13. The device according to claim 1, wherein said first clamping body extends beyond said distal end of said second clamping body.

14. The device according to claim 1, wherein a wall thickness at said distal end is less than half a wall thickness at said proximal end.

15. The device according to claim 1, wherein the second clamping body comprises a region which will break before the cable breaks when tension is applied to the cable.

* * * * *